United States Patent [19]

Barker

[11] Patent Number: 4,497,873

[45] Date of Patent: Feb. 5, 1985

[54] ISENTROPIC COMPRESSIVE WAVE GENERATOR IMPACT PILLOW AND METHOD OF MAKING SAME

[75] Inventor: Lynn M. Barker, Albuquerque, N. Mex.

[73] Assignee: The United States of America as represented by the Department of Energy, Washington, D.C.

[21] Appl. No.: 456,147

[22] Filed: Jan. 6, 1983

[51] Int. Cl.³ .......................... B22F 3/00; B22F 3/26; B22F 5/00; B22F 7/00
[52] U.S. Cl. ........................................ 428/547; 264/6; 264/65; 419/65; 425/77
[58] Field of Search ................. 124/60; 264/6, 65, 84; 419/65; 428/547; 425/77

[56] References Cited

U.S. PATENT DOCUMENTS

| | | | |
|---|---|---|---|
| 3,045,339 | 7/1962 | Callahan | 29/421 |
| 3,719,479 | 3/1973 | Flanagan | 428/547 X |
| 4,049,367 | 9/1977 | Tominaga et al. | 425/77 |
| 4,166,375 | 9/1979 | Stepantsov et al. | 72/430 |
| 4,385,880 | 5/1983 | Lemelson | 425/77 |
| 4,385,881 | 5/1983 | Ishizaka | 425/77 |

OTHER PUBLICATIONS

Hawke et al., J. Appl. Physics, vol. 43, pp. 2735 to 3741, (1972).

Primary Examiner—Leland A. Sebastian
Attorney, Agent, or Firm—James H. Chafin; Albert Sopp

[57] ABSTRACT

An isentropic compressive wave generator and method of making same. The wave generator comprises a disk or flat "pillow" member having component materials of different shock impedances formed in a configuration resulting in a smooth shock impedance gradient over the thickness thereof for interpositioning between an impactor member and a target specimen for producing a shock wave of a smooth predictable rise time. The method of making the pillow member comprises the reduction of the component materials to a powder form and forming the pillow member by sedimentation and compressive techniques.

19 Claims, 8 Drawing Figures

ISENTROPIC COMPRESSIVE WAVE GENERATOR IMPACT PILLOW AND METHOD OF MAKING SAME

BACKGROUND OF THE INVENTION

1. FIELD OF THE INVENTION

The present invention relates to the generation of shock waves by impact apparatus and more particularly, but not by way of limitation, to an Isentropic Compressive Energy impact disk or pillow for interpositioning between an impactor member and a target specimen for controlling the shock wave rise times and including a method of manufacturing said pillows by a particle sedimentation process.

2. HISTORY OF THE PRIOR ART

Shock wave techniques are used for a number of purposes in today's technology. The information they provide on the behavior of materials at very high pressures and deformation rates has useful applications in such fields as seismology, mining, and weapons technology. Shock waves are also used to synthesize industrial diamonds and boron nitride, and they can impart unique chemical properties to certain materials, increasing their catalytic activity by several orders of magnitude. Shock waves provide the only way to measure material properties at the ultra-high pressures which exists in the interiors of large bodies such as planets. Additional uses for shock waves are still being discovered.

One of the methods for creating high-pressure shock waves is to impact the target with a projectile which has been accelerated to a high velocity by a specially designed gun. It is generally desirable to use the impact to create motion in a single direction in as large a region of the target as possible, because the simplicity of such motion makes it more mathematically tractable and hence leads to better determinations of the properties of the target specimen. In order to obtain one-dimensional motion, the impact surfaces of the target and the projectile nose are made flat, and the impact takes place in a vacuum.

Such flat plate impacts cause shocks with almost instantaneous rise-times to be generated in both the target and the projectile nose-piece. The shock propagating through the target compresses it and raises its temperature. Because of the dissipative effects associated with the very sudden jump in pressure, the temperature increase can be thousands of degrees if the shock pressure is sufficiently high. The experimenter has little control over the rise time of the shock and the temperature behind the shock front, i.e., the entropy increase, in these traditional experiments.

In order to prevent most of the entropy increase associated with impact testing, some experiments have achieved quasi-isentropic waves by using a ring-up effect in liquid hydrogen, by using several layers of different materials to break up the shock, or by magnetic compression.

In the former two cases, a large shock is replaced by a number of smaller component shocks. Although this prevents most of the entropy increase of the single large shock, the strain rate in the overall wave profile is not well defined because it is very high in any one of the small shock components, and almost zero during the brief interval between any two small shock components. This decreases the usefulness of these waves in many cases where the material properties of concern are functions of the strain rate.

The magnetic compression experiments produce cylindrical (two dimensional) compression of the specimen instead of linear, one dimensional, compression. Such experiments have suffered from difficulties in accurately measuring the pressure and volume reached during the compression.

SUMMARY OF THE INVENTION

The present ivention provides a thin piece of material hereinafter referred to as a "pillow" which, when attached to a projectile nose piece, cushions the impact with a target so as to produce a substantially isentropic compressive energy (ICE) wave in the target, as opposed to the traditional somewhat square shock wave. The rise time of an ICE wave is much longer and it produces a much smaller temperature increase than a shock wave. The ability to control the rise time and entropy increase in planar shock experiments will greatly enhance the usefulness of shock techniques.

The pillows for generating ICE waves in impact experiments are made from the powders of two or more materials with different shock impedances. The powders are blended by sedimentation techniques in a layer on a surface in a manner in which the powder at the bottom portion of the layer is composed primarily of the highest shock impedance material, while powder at the top is composed primarily of the lowest shock impedance material. When placed on a projectile nose piece with the low shock impedance material surface representing the impact surface, the ICE wave will have the desired smoothly-rising profile after a single small initial shock if the transition from low to high shock impedance is smooth through the thickness of the pillow.

Other materials exhibiting shock impedance of an intermediate range may be included in the composition to aid in attaining the gradual change from lower to higher shock impedance materials over the thickness of the pillow.

The uniform spreading and blending of the powders is accomplished by sedimentation techniques. The constituent powders are thoroughly mixed in a liquid and then allowed to settle. If the concentration of the powders in the liquid is kept sufficiently small, and if the particle size distributions of the constituent powders are appropriately controlled, the settling velocities of the particles will produce the desired density gradient over the thickness of the pillow in order to achieve the required smoothly rising shock profile.

The process for making the pillows comprises the steps of (a) reducing the component materials of varying shock impedances to granular form or into particles of a required size distribution in order to form, through sedimentation, the desired density gradient; (b) thorougly mixing the component materials in an entrainment liquid and permitting the material to settle onto a flat horizontal surface; and (c) removing the liquid and compressing the material into the desired pillows. The detail procedures will be hereinafter more fully set forth.

OBJECTS OF THE INVENTION

An object of the present invention is to provide an isentropic compressive wave generator for producing a smoothly rising shock wave profile with a well defined strain rate.

Another object of the present invention is to create isentropic compression in a plane-wave, uni-axial strain configuration such that the measurement of the wave profile at two different distances of propagation will yield accurate information on the pressure-volume-energy path followed by the material during compression.

Still another objective of the present invention is to develop a means for creating ICE waves over a very large range of peak pressures.

DESCRIPTION OF THE DRAWINGS

Other and further objects and advantageous features of the present invention will hereinafter more fully appear in connection with a detailed description of the procedures and the drawings wherein.

DESCRIPTION OF THE PREFERRED EMBODIMENTS

Figure 1:
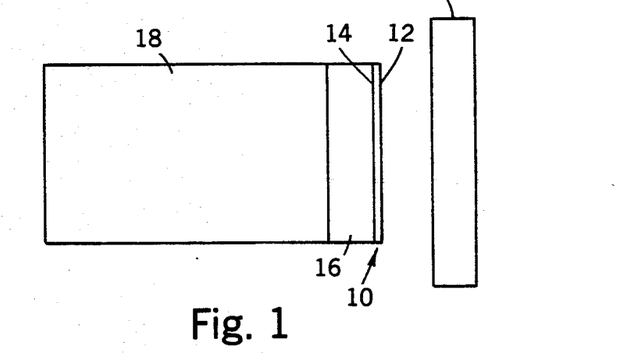
FIG. 1 is an elevational view of impact shock producing components employing a compressive wave generator embodying the invention.

Referring to FIG. 1 of the drawings, reference character 10 generally indicates an isentropic compressive wave generator member which comprises a thin piece of material having substantially uniform thickness, hereinafter referred to as a "pillow".

The pillow comprises a front impact surface 12 and an opposite rear or attachment surface 14. The pillow is constructed of a material such that the material at the impact surface 12 exhibits low shock impedance, the material continuously increasing in shock impedance through the thickness thereof and terminating at the rear or attachment surface 14 with a high impedance material. The pillow material is made up of two or more component materials exhibiting varying shock impedances. Shock impedances used herein is the product of the material density and its sonic wave velocity.

The rear surface 14 of the pillow 10 is attached to an impactor member 16 which in turn is attached to or made as a part of a high velocity projectile 18. The low impedance or front surface 12 of the pillow is intended to linearly strike a target specimen indicated by reference character 20.

Figure 2:
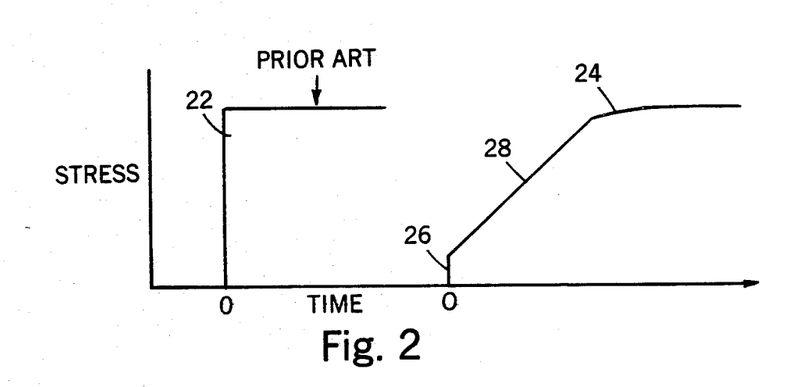
FIG. 2 is a stress versus time graph comparing the prior art with the present invention.

Referring now to FIG. 2 of the drawings, in traditional shock wave experiments, the shock wave imparted to the target is for all practical purposes a square wave as indicated by reference character 22 with an extremely short rise time which tends to produce a temperature increase within the target specimen. Because of the dissipative effects associated with the sudden jump in pressure, the temperature increase can be thousands of degrees if the shock pressure is sufficiently high.

However, by interpositioning the isentropic wave generator pillow 10 between the projectile impactor member 16 and the target 20, and an isentropic compressive energy (ICE) wave is produced in the target and is generally represented by reference character 24 in FIG. 2. In viewing the curve 24, an initial shock is experienced in the target as indicated by the step portion 26 of the curve 24 whereupon the pillow member 10 begins to cushion the shock with the front or low impedance portion 12 starting to give thereby producing a smoothly rising wave profile 28 in the target specimen as the pillow is compressed. The profile then levels off due to the substantially constant shock impedance of the projectile nose piece or impactor member 16.

Figure 3:
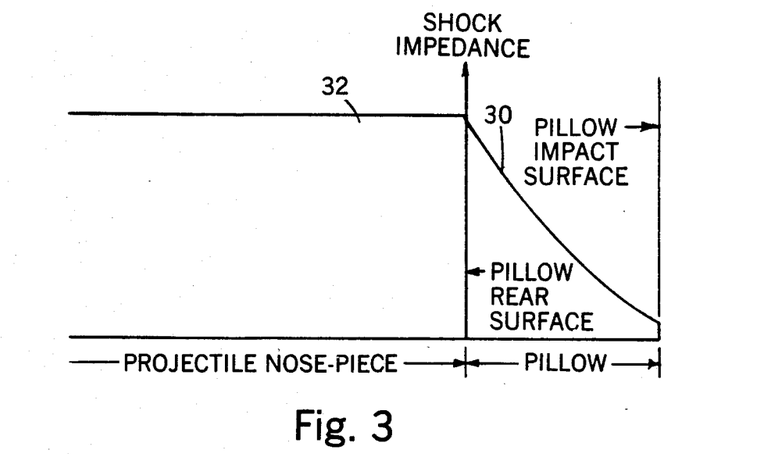
FIG. 3 is a shock impedance graph of a projectile nose piece having a pillow member embodying the present invention attached thereto.

Referring now to FIG. 3 of the drawings, reference character 30 indicates a shock impedance curve over the thickness of a pillow member terminating in a substantially flat impedance curve at 32 representing shock impedance of the projectile nose piece.

As herein before set forth the pillows for generating ICE waves in impact experiments are made from the powders of two or more materials of different shock impedances.

One of the powders must have a high shock impedance and another must have a low shock impedance. Additional powders of intermediate shock impedance can also be incorporated in the recipe to aid in obtaining the smooth shock impedance gradient desired. Other ingredients may be added to the recipe to aid in binding the powders together to produce the final pillow with sufficient strength to withstand normal handling and the acceleration on the nose of the projectile just before impact.

Component materials with only modest yield strengths are desirable so that the powder particles can be crushed to solid density with reasonable pressing pressures. If the powders are too strong to be pressed to solid density, the high shock impedance desired on one surface of the pillow cannot be obtained because shock impedance decreases rapidly with porosity.

Some materials undergo polymorphic phase transitions under impact loading to high pressures. Powders used as component materials for the pillows must not have such phased transitions which would tend to ruin the smoothness of the generated isentropic wave profile.

The pressed pillow needs to have some structural integrity in order to survive normal handling and acceleration. Powders which tend to bind well to themselves and to other constituent powders as a result of the pressing operation are desirable.

Naturally for ease and safety of handling the powders it is advantageous to use only powders which are non-toxic. In high volume, production cost is also to be considered to avoid using extremely expensive materials.

Tantalum has been considered as a high shock impedance material. Tantalum exhibits moderate yield strength, has no phase transitions, appears to bind well and is non-toxic. It is moderately expensive, but much less expensive than gold or platinum which are two other high shock impedance competitors. Certain plastics including polyolfines serve well as a low impedance material in that they exhibit very low shock impedance, have low yield strength and no known phase transitions.

The material is non-toxic and very inexpensive. After pressing, but before removing the pillow from the mold and while maitaining a vacuum as will be hereinafter set forth the pillow may be heated in order to melt the polyolfine powder so that on cooling it resolidifies around other powder particles and acts as an excellent binder.

Another desirable feature of polyolfine is that in the melted state it is very viscous so that the other powder particles do not settle through the melted polyolfine, thereby maintaining the desired mass distribution through the pillow thickness.

Examples of materials having intermediate values of shock impedance, modest yield strength and no phase transitions are copper, tin and aluminum. These materials tend to bind well, are non-toxic and inexpensive.

Although the specific materials specified herein meet the desired characteristics for constructing an isentropic compressive wave generator pillow, other materials which meet the criteria set forth herein may be utilized within the spirit and scope of the invention.

As stated, the uniform spreading and blending of the powders is accomplished by sedimentation techniques in a suitable entrainment liquid. Isopropal alcohol has been found to be suitable when used in conjunction with the component materials identified herein. The constituent powders are thoroughly mixed in the liquid and allowed to settle. If the concentration of powders is kept sufficiently small, the settling velocity of any particular particle can be calculated or approximated from the following equation which is based on Stoke's Law:

$$v = \frac{2gr^2(p - p_f)}{9h}$$

where;
 g is the gravitational acceleration,
 p is the density of the particle,
 $p_f$ is the density of the liquid,
 r is the particle radius, and
 h is the viscosity of the liquid.

It is noted that Stokes' Law resumes spherical shape particles which seldom occurs in practice. However, this problem is hereinafter addressed.

It is seen from the equation based on Stokes' Law that if the particles of the powders are not of the same size, the larger particles will settle considerably more rapidly than the smaller ones. The rate of accummulation of material at the bottom will initially be relatively rapid and will consist of particles of all sizes, but soon all of the largest, fastest sinking particles will have settled out. Therefore, the average size of the sedimenting particles and the rate of accumulation of material on the bottom will continually decrease with time.

Consider for explanation purposes, equal volumes of two powders of two different materials to be mixed thoroughly in the liquid and then allowed to settle. If one of the powders tends to settle more rapidly than the other, the accumulating sediment will at first consist primarily of the rapidly settling powder, but it will soon change to primarily the slow settling powder as the liquid becomes depleted of the faster settling component.

If the particle size distributions of the powders are continuous and smooth, the transition from primarily the one powder to primarily the other in the sediment will be gradual and smooth. Thus, the process of sedimentation can produce the desired blending of powders for pillow fabrication.

In principal, nearly any desirable gradient in pillow properties can be achieved by proper control of the materials and particle size distributions of the powders in a sedimentation process. Since precise control of the particle size distribution of a given powder is often difficult, it is sometimes convenient to mix more than two powders into the liquid to produce the desired shock impedance gradient in the pillow.

In order to avoid expensive and time consuming trail and error approaches to optimizing the amounts and particle size distributions (recipes) for pillows, it is highly desirable to be able to calculate the pillow properties which will result from a given recipe without actually making and testing the pillow. This can be done by measuring the particle size distributions of each of the constituent powders and then using Stokes' Law to approximate the accumulation rate of each constituent powder during the course of the sedimentation process. This information can be translated into the volume fractions of the constituent powders at any point in the sediment, and the volume fractions can be used to calculate the pillow shock impedance profile by the application of mixture theory.

In order for the sedimentation to take place according to Stokes' Law, it has been found necessary to keep the concentration of powders in the sedimenting liquid quite low, even of the order of one percent by volume or less. Even at very low concentrations, as stated, Stokes' Law applies (strictly speaking) only to spherical particles which settle out of the liquid individually rather than in groups of particles which tend to stick together. However, actual powders are seldom composed as spheres and even when very well stirred into the sedimenting liquid many particles often do not tend to settle out individually but rather in pairs or in larger groups.

The problem of non-spherical particles and of tendencies to settle in groups is solved by the choice of the method used to characterize the particle size distributions of the constituent powders. Instead of measuring the actual size distribution of the particles in a powder, an artificial size distribution is obtained which predicts the correct sedimentation rate when Stokes' Law of sedimentation is assumed.

The artificial size distribution may be measured by a commercial device called a Sedigraph, which used x-rays to detect the mass sedimentation rate as a function of time after stirring the powder in a liquid. The measured sedimentation rate versus time is then used to calculate a particle size distribution, assuming the sedimentation occurs according to Stokes' Law. Of course, the resulting measurement of particle size distribution may not be accurate because the particles may not be spheres and they may not all settle out individually as assumed when using Stokes' Law to calculate the distribution.

Nevertheless, if the calculations are reversed, i.e., if Stokes' Law and the particle size distribution obtained from the Sedigraph are used to calculate the sedimentation rate in the sedigraph experiment, the correct sedimentation rate versus time is obtained. Thus, the artificial particle size distribution obtained from the Sedigraph should predict the correct sedimentation rates in actual pillow sediments as well.

Since the sedimentation time can be of the order of several hours, care must be taken to prevent unwanted convection currents in the sedimenting liquid as a result of a non-uniform temperature environment.

One primary method of controlling convection currents is to eliminate temperature gradients as much as possible. Temperature sources such as room heaters or the evaporation of the sedimenting liquid should be avoided. An additional method which helps to physically restrict the liquid from large scale convection is by inserting a very thin-wall honeycomb or longitudinally compartmented structures into the liquid at a depth, such that the top of the structure is above the top of the liquid, and the bottom is somewhere above the top of the anticipated sediment layer. Such a device will also be useful in immediately stopping the swirling of the liquid when the sedimenting process is started so that initial sedimentation will be uniform over the base of the sedimenting tank.

Convection currents could also be prevented by purposely inducing a vertical temperature gradient into the sedimenting liquid. If the temperature continually decreases with depth, such that the top of the liquid is relatively warm and the bottom is cool, no convection should occur because the more dense, cooler liquid is already on the bottom. One method of establishing a desirable temperature gradient would be to gradually insert a uniformly preheated baffle member such as a honeycomb structure into the liquid from the top, causing most of the heat to be transferred to the upper layers of the liquid while simultaneously damping any swirling motion or turbulence of the liquid.

Since the sedimentation of the smallest particles in the recipe takes a long time, it is advantageous to limit the time during which the sedimentation is allowed to continue. Since even the slightest convection currents can adversely affect distribution of these finest particles in the sediment, relatively rapid changes in the composition of the sediment could tend to occur at a late time. These problems can be eliminated by draining off the liquid before they arise.

Referring now to FIGS. 4, 5, 5A, 5B and 5C, the process that has been developed will be more specifically described. It is noted at this point that alternate procedures might also be envisioned to fabricate pillows by the general sedimentation methods already discussed and without departing from the spirit and scope of the invention.

First, a computer might well be utilized to develop a recipe for an optimum pillow for a particular application using available data and applying Stokes' Law as herein before set out.

Second, the amounts of the various powders are carefully weighed out and placed in individual small jars nearly filled with isopropyl alcohol or other entrainment liquid and shaken vigorously. Each jar may then be subjected to an ultrasonic treatment using a commerical ultrasonic cleaner. The ultrasonic treatment causes breakdown of the powders into individual particles or very small groups of particles and assures a starting point which can be reproduced in subsequent pillows if desired.

Figure 4:
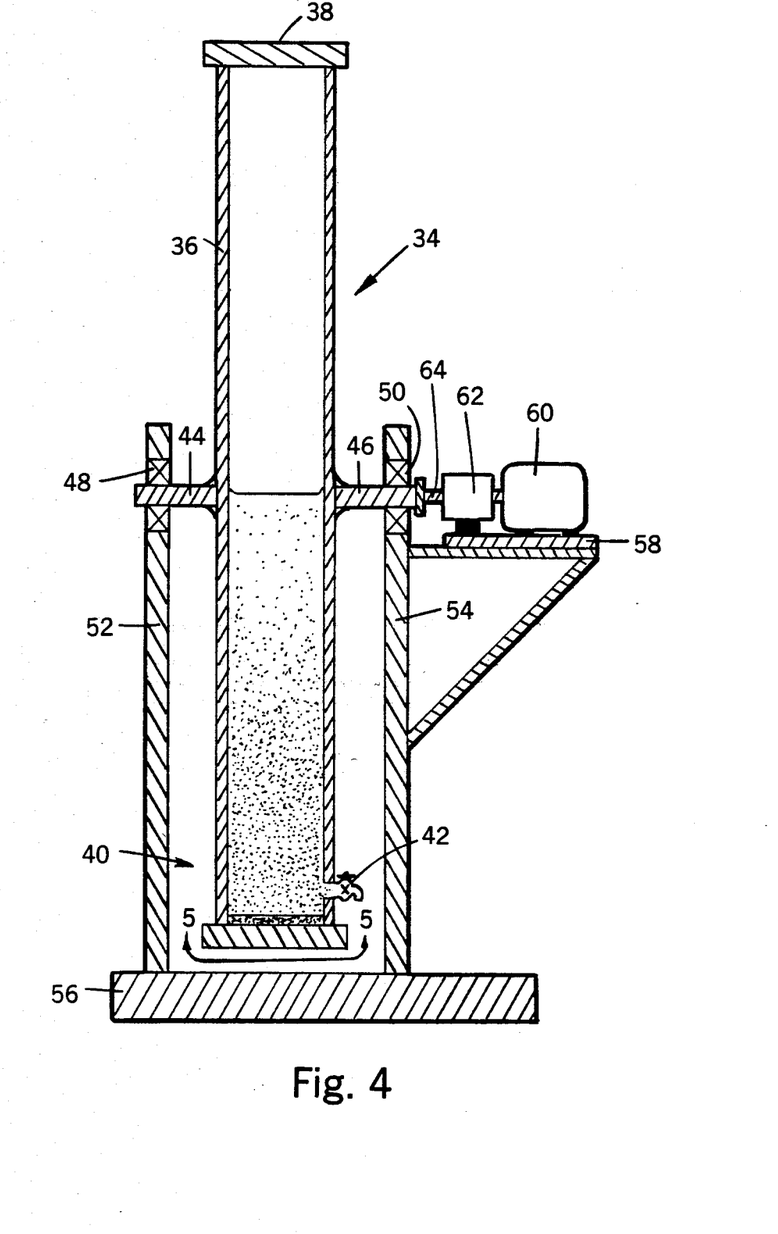
FIG. 4 is an elevational sectional view of a container for forming compressive wave generator pillows.

Third, the jars containing the constituent alcohol-powder mixtures are emptied into a suitable sediment tank as generally indicated by reference character 34 in FIG. 4 of the drawings.

The tank 34 comprises an elongated vertical-walled tube 36 which may be closable at one end by cap member 38 and is provided with a base plate assembly generally indicated by reference character 40 at the opposite end. The base plate assembly 40 is more particularly described in connection with a description of FIG. 5 of the drawings as will be hereinafter set forth. A primary drain valve 42 is provided to communication with the interior of the tube 36 near the base plate assembly 40.

The center portion of the tube 36 is provided with a pair of outwardly extending axle members 44 and 46 which are journaled in oppositely disposed aligned bearings 48 and 50 respectively. The bearings are mounted in upwardly extending standards 52 and 54, respectively which are in turn supported by a base member 56.

The standard 54 is shown with an equipment support platform apparatus 58 which provided with a motor 60 and associated gear box 62 mounted thereon. The output of the motor 60 is connected to the gear box 62, the output of the gear box 62 being coupled to the tube axle member 46 by a suitable coupler member 64 whereby said tube 36 can be rotated about a horizontal axis defined by the axle members 44 and 46.

After the jars containing the alcohol powder mixtures are added, additional alcohol is added until the tank is approximately half full. The cap member 38 is then placed on the tank and the entire tank is rotated about its center axis of rotation at a speed to achieve maximum vigorous mixing action. The mixing is continued until the powders are uniformly disbursed in the alcohol.

Fourth, the mixing action is stopped and the sediment tank tube member 36 is aligned to a vertical position as shown in FIG. 4 of the drawings. The base assembly 40 for the sediment tube 36 may then be utilized to very accurately level a centrally disposed base plate 66 for receiving the sediment deposit.

Figure 5:
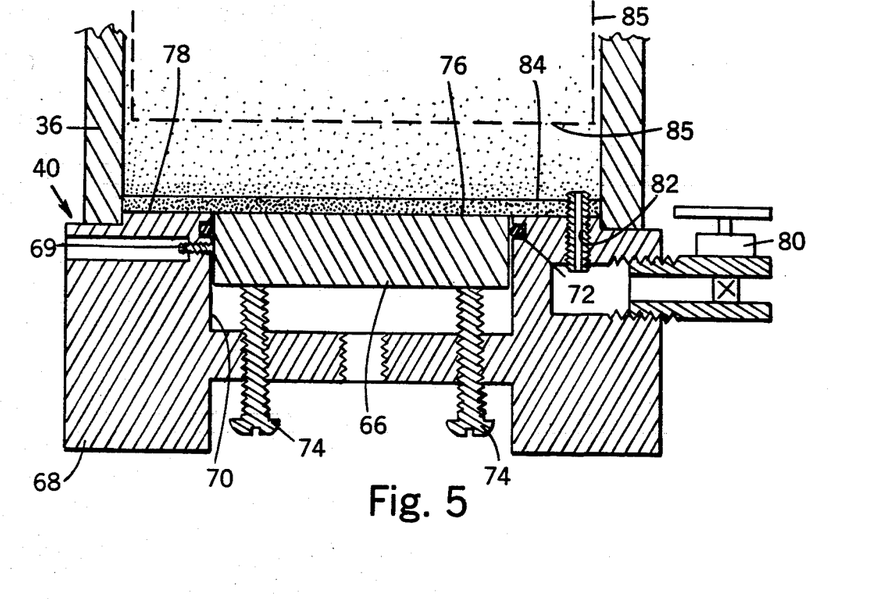
FIG. 5 is a detailed elevational sectional view of the base of the container of figure four taken along the broken lines 5—5 of figure four.

Refering to FIG. 5 of the drawings, the base plate assembly 40 generally comprises a block member 68 which is sealingly fitted to the base of the tube member 36. The block 68 is provided with a central cavity portion 70 for reciprocally receiving the base plate member 66 therein. The outer periphery of the base plate 66 is shaped to closely conform to the walls of the cavity 70 and is sealed with respect thereto by suitable O-ring 72. Leveling of the base plate 66 is accomplished by at least three leveling screw members indicated by reference character 74 which are carried by the block member 68. The screw members 74 are utilized to adjust the base plate 66 so that a top surface 76 thereof is level and substantially flush with an upper annular portion 78 of the block 68. The base plate 66 may be secured in position by six screws, one of which is indicated by reference character 69.

A secondary drain valve 80 is carried by the block member 68 and is provided with a riser tube 82 which extends into the bottom of the sediment tube 36 such that the upper end thereof is disposed just above the top of the intended sediment layer indicated by reference character 84.

Once the base plate 66 has been properly leveled and secured, sedimentation is allowed to proceed for a specified period of time usually from five to twenty-four hours. It is noted that at this point in time a baffle member indicated by reference character 85 may be lowered into the tube 36. The baffle member 85 may comprise a honeycomb structure which in effect compartmentizes the sediment mixture thereby dampening any swirling or wave motion in the liquid. The baffle member 85 may also be preheated and then slowly inserted into the liquid in order to establish a temperature gradient in the liquid, the higher temperature being at the top of the container to prevent or reduce convection currents therein. It is further noted that a lower end of the baffle member 85 is positioned above the intended sediment layer 84.

Fifth, at the end of the sedimentation period the primary drain valve 42 is opened and most of the alcohol and the remaining suspended powders are slowly drawn off. More alcohol is then very slowly drained through the secondary valve 80 until almost no liquid layer remains above the sediment at the bottom of the tank. The sediment is then thoroughly air dried and the tube member 36 is then carefully removed from the block member 68 and base plate 66 upon which the sediment has deposited.

Figure 5A:
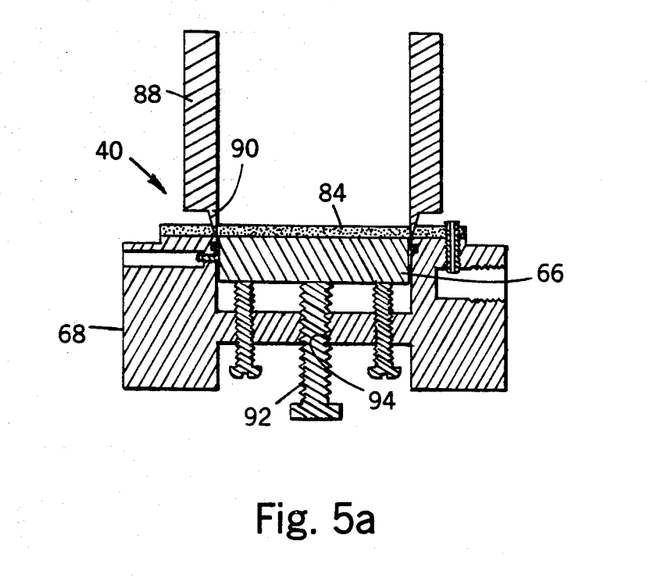
FIG. 5A is a sectional elevational view of the base of FIG. 5 depicting a step of the process embodying the invention.
Figure 5B:
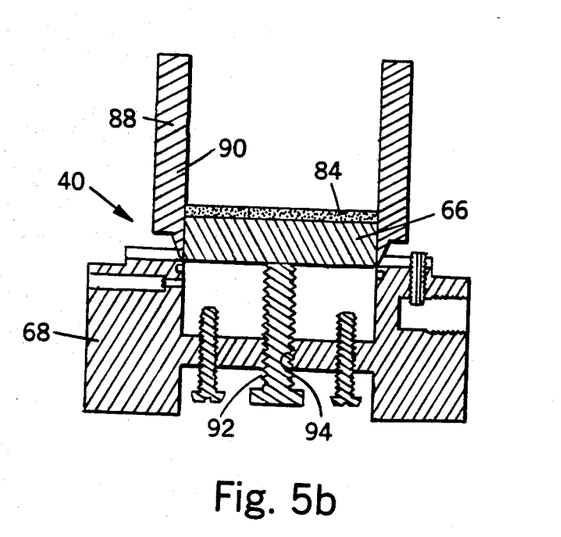
FIG. 5B is a sectional elevational view of the base of FIG. 5 depicting another step of the process.
Figure 5C:
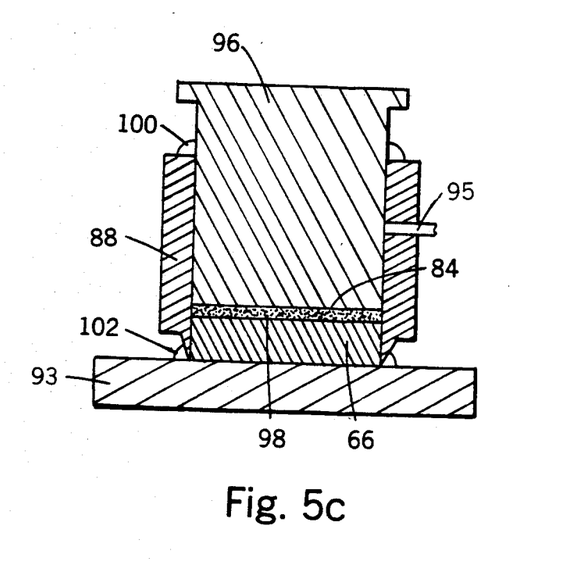
FIG. 5C is a sectional elevational view of the base of FIG. 5 depicting still another step of said process.

Sixth, referring to FIG. 5A of the drawings, a portion of the sediment layer 84 is inserted into one end of a pressure tube 88, the pressure tube 88 having a lower edge thereof formed as a cutting blade 90. The shape and size of the cutting edge 90 is of approximately the same shape and size of the outer periphery of the base plate 66. A drive screw 92 may be threaddedly disposed within a threaded aperture 94 in the block number 68 for pressing the base plate 66 and the associated sediment desposit 84 upwardly into the pressure tube 88 as shown in FIG. 5B. The pressure tube 88 and the base plate 66 and associated sediment deposit 84 is then placed on a flat steel pressing base member 93 and held in place by any well known means as shown in FIG. 5C. The pressure tube 88 is provided with a vacuum port 95 which may be connected to a suitable vacuum pump (not shown).

A piston member 96 is then inserted in the pressure tube 88 such that a lower flat surface 98 thereof rests against the upper surface of the sediment deposit 84. A vaccum putty deposit 100 is used to form a seal between the piston 96 and the upper end of the pressure tube 88 and a second vacuum putty deposit 102 is utilized to form a seal between the bottom of the pressure tube 88 and the pressing base member 93 as shown in FIG. 5C. Any air or gas in the pressure tube 88, including air between the powder particles of the sediment deposit 84 is then removed from the vacuum port 95. While the vacuum is maintained, a downward force as applied to the piston 96 thereby raising the pressure on the sediment and causing the powder particles to flow to a fully-dense configuration. It has been found that a pressure of about 300 MPa may be successfully used on pillows containing tantalum, copper, tin, and polyolfine powders.

The pressure on the sediment layer 84 is then released and if the constituent powder materials have sufficient binding quality the compressive wave generator pillow is complete. However, when the lower impedance material is of a plastic material such as polyolfine the temperature of the pillow still installed in the pressure tube 88 may be raised to a sufficient temperature and for a sufficient length of time to allow the polyolfine material to melt and form a binder to provide the final pillow with sufficient strength to withstand normal handling and the acceleration experienced prior to impact with a target specimen.

From the foregoing it is apparent that the present invention provides an isentropic compressive wave generator for producing a substantially isentropic compressive energy wave when interpositioned between a projectile nose piece and a target specimen.

The foregoing also outlines a procedure for fabricating pillow members which produce smoothly rising shock wave profiles with well defined strain rates.

Whereas the present invention had been described in particular relation to the process set forth herein and the drawings attached hereto, other and further modifications apart from those shown or suggested herein may be made within the spirit and scope of the invention.

I claim:

1. A thin pillow member of substantially uniform thickness having an attachment surface for attaching the pillow member to an impactor member and an opposite impactor surface for impacting a target in an isentropic compressive wave generator, said pillow member comprising material at the impactor surface of low shock impedance and graduating substantially uniformly over the thickness of the pillow member to a material of high shock impedance at the attachment surface.

2. A pillow member as described in claim 1 wherein said material comprises at least two component materials, a first component material being of low shock impedance and concentrated at the impact surface, the second component material being of high shock impedance and concentrated at the attachment surface, the component materials exhibiting a substantially uniform density gradient over the thickness of the pillow member.

3. A pillow member as described in claim 2 wherein the first component material is selected from tantalum, gold, and platinum.

4. A pillow member as described in claim 2 wherein the first component material is tantalum.

5. A pillow member as set forth in claim 2 wherein the second component material is selected from plastics which can be reduced to powder form and which have low shock impedance.

6. A pillow member as described in claim 2 wherein the second component material is polyolfine.

7. A pillow member as described in claim 2 and including a component material of substantially any shock impedance and being capable of binding the other component materials, said additional component material having no known phase transitions.

8. A pillow member as described in claim 2 and including one or more component materials of intermediate shock impedance interspersed through said pillow member and exhibiting a substantially smooth density gradient.

9. A pillow member as described in claim 8 wherein the component materials of intermediate shock impedance are selected from copper, tin, and aluminum.

10. A method for producing isentropic compressive wave impact generator pillows by sedimentation process comprising the steps of:
   a. Reduction of a first component material of high shock impedance to granular particles of a first desired size distribution;
   b. Reducing a second component material of low shock impedance to granular particles of a second desired size distribution relative to the first component materials such that the first component material will settle faster in an entrainment liquid;
   c. Mixing the first and second component materials in an entrainment liquid medium and placing the mixture in a container;
   d. Positioning the container in a vertical position and permitting the material to settle on a flat horizontal surface;

e. Removing the liquid;

f. Drying material;

g. Compressing the material into a pillow.

11. A method for producing isentropic compressive wave generator pillows as described in claim 10 and including the step of introducing a baffle member into the container in communication with the liquid and positioning the lower end of the baffle member above the bottom of the container by an amount greater than the desired generator pillow thickness for reducing turbulence in the liquid containing the component materials.

12. A method for producing isentropic compressive wave generator pillows as described in claim 11 and including a step of preheating the baffle member at a higher temperature than the liquid in the container and slowly inserting the baffle member into the liquid to establish a temperature gradient for the control of convection currents.

13. A method for producing isentropic compressive wave generator pillows as described in claim 10 and including the step of introducing a vertical temperature gradient in the container and liquid contained therein to control convection currents.

14. A method for producing isentropic compressive wave generator pillows as described in claim 13 wherein the higher temperature is at the top of the container for substantially stopping convection currents.

15. A method of producing isentropic compressive wave generator pillows as described in claim 10 and including the step of reducing one or more addtional component materials of intermediate shock impedance to granular particles of desired relative size to the other component materials to provide the desired density gradient during sedimentation.

16. A method of producing isentropic compressive wave generator pillows as described in claim 10 wherein the high impedance material as selected from tantalum, gold and platinum.

17. A method of producing isentropic compressive wave generator pillows as described in claim 10 wherein the low impedance material is selected from plastics including polyolfine and including the step of heating the compressed pillow to a temperature and for a time to initiate melting of the low impedance plastic material to serve as a binder for the finished pillow.

18. A method for producing isentropic compressive wave generator pillows as set forth in claim 15 wherein the intermediate shock impedance material is selected from copper, tin and aluminum.

19. A method for producing isentropic compressive wave generator pillows as described in claim 10 wherein the steps of reducing material to granular particles includes mixing the materials in small quantities of entrainment liquid and subjecting the mixtures to ultrasonic treatment for breaking the constituent materials into individual particles.

* * * * *